(12) United States Patent
Maier et al.

(10) Patent No.: US 9,056,350 B2
(45) Date of Patent: Jun. 16, 2015

(54) DEVICE AND METHOD FOR MANUFACTURING WIRE COILS

(75) Inventors: Michael Maier, Remseck (DE); Heinz Mueller, Feiberg A.N. (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/984,864

(22) PCT Filed: Jan. 31, 2012

(86) PCT No.: PCT/EP2012/051538
§ 371 (c)(1),
(2), (4) Date: Oct. 16, 2013

(87) PCT Pub. No.: WO2012/110311
PCT Pub. Date: Aug. 23, 2012

(65) Prior Publication Data
US 2014/0034182 A1   Feb. 6, 2014

(30) Foreign Application Priority Data

Feb. 17, 2011   (DE) .......................... 10 2011 004 285

(51) Int. Cl.
*B21F 3/02*   (2006.01)
*H02K 15/04*   (2006.01)

(52) U.S. Cl.
CPC .............. *B21F 3/02* (2013.01); *H02K 15/0435* (2013.01)

(58) Field of Classification Search
CPC .............. H02K 15/06; H02K 15/0478; H02K 15/0435; B21F 3/02
USPC ............................ 140/92.1, 92.2, 105; 72/191
See application file for complete search history.

(56) References Cited

U.S. PATENT DOCUMENTS

| | | | |
|---|---|---|---|
| 2,963,048 A | 12/1960 | Smith | |
| 3,398,768 A | 8/1968 | Van Hoof | |
| 3,760,851 A * | 9/1973 | Schmidt et al. ............... | 140/105 |
| 3,802,241 A | 4/1974 | Huhnen | |
| 4,331,896 A | 5/1982 | Sedgewick | |
| 4,399,843 A | 8/1983 | Sedgewick | |
| 4,425,773 A | 1/1984 | Fabrig | |
| 4,426,871 A | 1/1984 | Fabrig | |
| 7,185,414 B2 * | 3/2007 | Sadiku .......................... | 140/92.1 |
| 2004/0261885 A1 | 12/2004 | Sadiku et al. | |

FOREIGN PATENT DOCUMENTS

| | | |
|---|---|---|
| DE | 1 552 146 | 3/1970 |
| DE | 103 28 955 | 2/2005 |
| DE | 10 2006 009107 | 11/2006 |
| GB | 1 358 070 | 6/1974 |

OTHER PUBLICATIONS

International Search Report for PCT/EP2012/051538, dated Mar. 26, 2013.

* cited by examiner

*Primary Examiner* — Teresa M Ekiert
(74) *Attorney, Agent, or Firm* — Kenyon & Kenyon LLP

(57) ABSTRACT

A device for manufacturing wire coils includes: at least two rotationally supported drums which are mounted at a predefined distance from one another, the at least two drums each having at least one bending peg mounted on a lateral surface of the corresponding drums and protruding essentially perpendicularly, a movable wire guiding device winding the wire around the bending pegs protruding from the at least two drums to produce at least one wire winding. The wire guiding device aligns the wire between two bending pegs under a predefinable elastic tension and winds the wire under tension around the corresponding bending peg due to a rotational movement.

11 Claims, 3 Drawing Sheets

DEVICE AND METHOD FOR MANUFACTURING WIRE COILS

BACKGROUND OF THE INVENTION

1. Field of the Invention

The present invention is directed to a device and a method for manufacturing wire coils.

2. Description of the Related Art

Published German Patent Application document DE1552146 describes a device for aligning wire. The device described there continuously shapes a feed wire to form a chain of multiple windings, wire parts being aligned between two bending pegs to form a completely linear shape in each winding. For this purpose, the device described there has two drums, which, with perpendicular axes of rotation, are rotatingly situated in direct proximity to one another. The drums have perpendicularly protruding bending pegs impressed onto their corresponding lateral surfaces. A wire feed guides a wire, while drums are synchronously rotating from a bending peg of the first drum to a bending peg opposite the latter on the second drum which is situated beneath the first drum. The wire is thus wound onto the bending pegs through the combination of two movements, namely a predefined curved path of the wire guide, which has an essentially elliptical shape, which is formed by the up-and-down movement of the wire feed, and the rotation of the drums. This results in a flat coil being guided on the further circumference of the two drums while still being held securely on a moving adhesive strip and removed from the circumference of the drums by a gripper. The wire is thereby aligned by the fact that the two drums are separated from one another locally after winding the wire onto the bending pegs, whereby the wire is stretched tightly beyond the limit of elasticity.

BRIEF SUMMARY OF THE INVENTION

The device according to the present invention for manufacturing wire coils and the method according to the present invention for manufacturing wire coils have the advantage over the related art that the wire coil is wound onto the drums under elastic wire tension, and the wire is aligned between the two bending pegs due to the elastic wire tension during the winding operation.

Specific embodiments of the present invention advantageously permit a simple and rapid implementation of even difficult winding requirements for the winding wire, so that wire coils for electric drives and generators may preferably be manufactured.

One device according to the present invention for manufacturing wire coils includes at least two rotationally supported drums which are mounted at a predefined distance from one another. The at least two drums have at least one bending peg each which are mounted on a lateral surface of the corresponding drum and protrude essentially perpendicularly. In addition, a movable wire guiding device is provided, which winds the wire around the bending pegs protruding away from the at least two drums to produce at least one wire winding. According to the present invention, the wire guiding device aligns the wire between two bending pegs under a predefinable elastic tension and winds the wire under tension around the corresponding bending peg due to a rotational movement.

One method according to the present invention for manufacturing wire coils, in particular for electric drives and generators, includes a winding operation in which a wire is wound by a movable wire guiding device around bending pegs protruding essentially perpendicularly away from at least two rotationally supported drums to produce at least one wire winding. The at least two drums here are at a predefinable distance from one another. According to the present invention, the wire is aligned between two bending pegs under a predefinable elastic tension and is wound under tension around the corresponding bending peg due to a rotational movement.

It is advantageous in particular that a first drum having a predefined first number of bending pegs is mounted on a rotary shaft in an edge area, a second drum having a predefined second number of bending pegs and a predefined first distance from the first drum is mounted on the rotary shaft, and a third drum having a predefined third number of bending pegs and a predefined second distance from the first or second drum is mounted on the shaft. The first number of bending pegs and/or the second number of bending pegs and/or the first distance and/or the second distance may advantageously be predefined as a function of winding requirements of the winding wire. The first distance between the first and second drums, for example, predetermines the length of the individual windings and the second distance between the first or second and third drums predetermines the length of an end winding, for example. This makes it advantageously possible to adapt the device according to the present invention to various wire coils to be manufactured for electric drives and generators. The drums may thus be detachably mounted on the shaft and shifted into another position as needed to vary the distances between the drums. Furthermore, the drums may be replaced to obtain a different number and shape of bending pegs. As another option, various replaceable winding drums may be used, each of which has a shaft on which a predefined number of drums is situated at predefined distances from one another having a predefined number of bending pegs to accelerate the adaptation process of the winding device to various wire coils. The winding drums then differ through the positions and specific embodiments of the drums, for example. At the same time, the winding drum clocks the division from winding to winding through the configuration of the bending pegs on the drums, while at the same time conveying the continuous wire in the direction of an embossing and cutting tool.

In one advantageous embodiment of the device according to the present invention, the rotary shaft is drivable in two directions of rotation by a first drive as a function of the winding requirements of the winding wire. Different feed rates for the individual windings may be predefined advantageously due to the rotation of the shaft to produce a flat winding.

In another advantageous embodiment of the device according to the present invention, the wire guiding device may be drivable in two directions of rotation as a function of the winding requirements of the winding wire to wind the wire around the bending pegs. In addition, the wire guiding device may be moved in a translatory movement by a third drive on a carriage to advantageously move the wire guiding device to different approach points as a function of winding requirements of the winding wire. The different approach points preferably correspond to the positions of the drums on the shaft.

In another advantageous embodiment of the device according to the present invention, the bending pegs each have a profile, which may be mapped via the bending of the wire. The profile may be designed to be round or polygonal, for example, to create different bending radii and/or curved shapes. Furthermore, the wire guiding device may increase the wire tension during the bending operation to make the wire conform to the profile of the corresponding bending peg.

In another advantageous embodiment of the device according to the present invention, each drum has a round and/or polygonal profile. The design as a polygonal profile having a plurality of straight lateral partial surfaces here facilitates the configuration and fastening of the bending pegs.

In another advantageous embodiment of the device according to the present invention, the elastic tension is predefined in such a way that the diameter of the wire changes by maximally ±2% during the winding operation. The required tolerances for the finished wire coil may therefore be maintained advantageously.

In another advantageous embodiment of the method according to the present invention, a first drum having a predefined first number of bending pegs is mounted on a rotary shaft in an edge area, a second drum having a predefined second number of bending pegs at a predefined first distance from the first drum is mounted on the rotary shaft, and a third drum having a predefined third number of bending pegs at a predefined second distance from the first or second drum is mounted on the shaft. The first number of bending pegs and/or the second number of bending pegs and/or the first distance and/or the second distance is/are predefined as a function of the winding requirements of the winding wire. The first distance between the first and second drums determines the length of the individual windings, and the second distance between the first or second and third drums determines the length of an end winding, for example.

Exemplary embodiments of the present invention are depicted in the drawings and are explained in greater detail in the following description. In the drawings, the same reference numerals are used to denote components and elements implementing the same or similar functions.

DETAILED DESCRIPTION OF THE INVENTION

Figure 1:
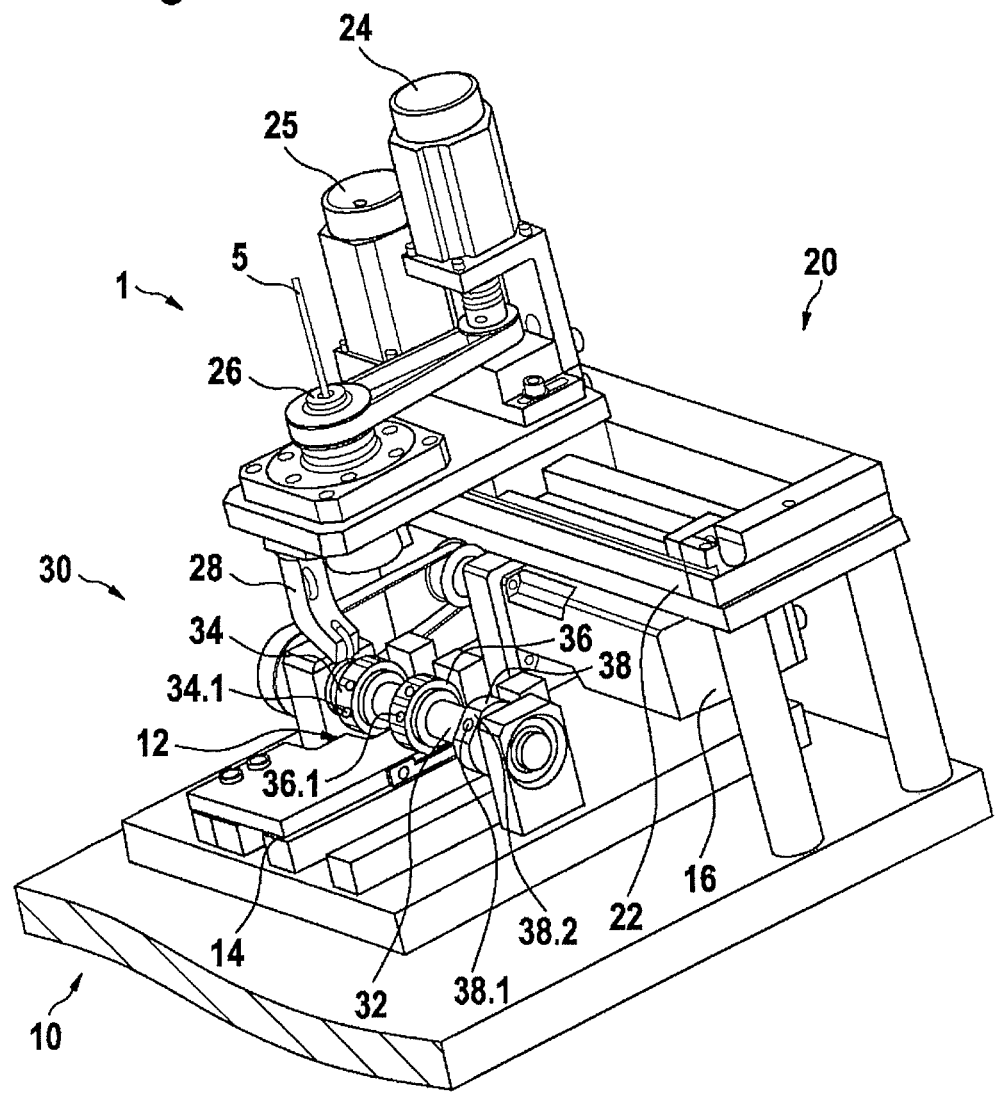
FIG. 1 shows a perspective illustration of an exemplary embodiment of a device for manufacturing wire coils.
Figure 2:
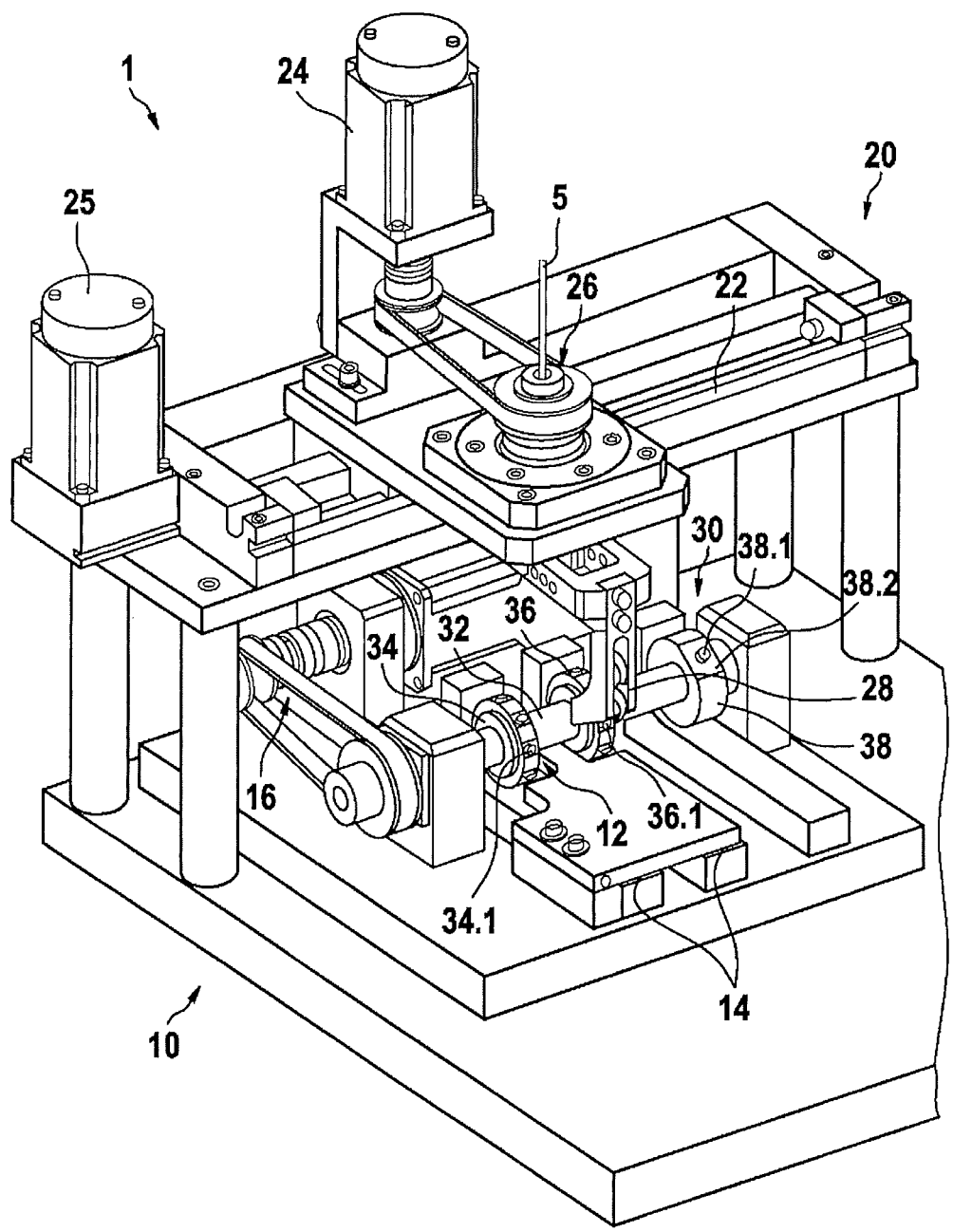
FIG. 2 shows another perspective illustration of the exemplary embodiment from FIG. 1.
Figure 3:
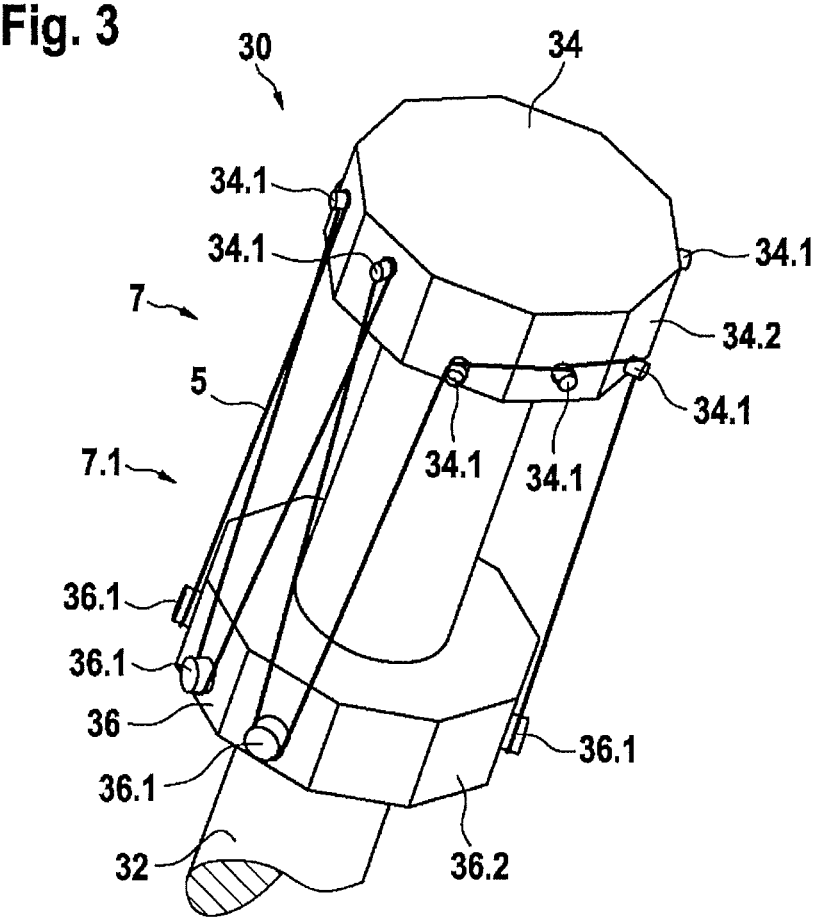
FIG. 3 shows a schematic perspective illustration of part of an exemplary embodiment of a winding drum for the device for manufacturing wire coils from FIGS. 1 and 2.

As is apparent from FIGS. 1 through 3, the exemplary embodiment of a device 1 for manufacturing wire coils 7 as shown here has three rotationally supported drums 34, 36, 38, which are mounted at a predefined distance from one another. Drums 34, 36, 38 each have at least one bending peg 34.1, 36.1, 38.1, mounted on a lateral surface 34.2, 36.2, 38.2 of corresponding drum 34, 36, 38, and protrude essentially perpendicularly. A movable wire guiding device 28, designed as a so-called flyer, winds wire 5 around bending pegs 34.1, 36.1, 38.1 which protrude away from at least two drums 34, 36, 38 to produce at least one wire winding 7.1, 7.2.

According to the present invention, wire guiding device 28 aligns wire 5 between two bending pegs 34.1, 36.1, 38.1 at a predefinable elastic tension and winds the wire under tension around corresponding bending pegs 34.1, 36.1, 38.1 due to a rotational movement.

As is also apparent from FIGS. 1 and 2, drums 34, 36, 38 are mounted on a rotary shaft 32 and form a winding drum 30.

First drum 34 having a predefined first number of bending pegs 34.1 is therefore mounted on a left edge area of rotary shaft 32. A second drum 36 having a predefined second number of bending pegs 36.1 at a predefined first distance from first drum 34 is mounted on rotary shaft 32, and a third drum 38 having a predefined third number of bending pegs 38.1 at a predefined second distance from first or second drum 34, 36 is mounted on shaft 32. The first number of bending pegs 34.1 and/or the second number of bending pegs 36.1 and/or the first distance and/or the second distance is/are predefined as a function of the winding requirements of winding wire 5. For this purpose, the mounting position of drums 34, 36, 38 on shaft 32 may be varied advantageously by shifting drums 34, 36, 38 on shaft 32, for example, or by replacing winding drum 30.

In the exemplary embodiment shown here, winding drum 30 having shaft 32 and drums 34, 36, 38 is situated on a substructure 10 of device 1 for manufacturing wire coils 7. In addition, substructure 10 has a first drive 16, which is capable of driving shaft 32 in two directions of rotation, as a function of the winding requirements of winding wire 5. Furthermore, a corresponding wire guiding system having rollers or runners is provided on substructure 10 to guide individual windings 7.1, 7.2 of wire 5 from winding drum 30 into a delivery gap 14 via a stripper 12. Windings 7.1, 7.2 stripped off from winding drum 30 are advanced as a flat package from device 1 through delivery gap 14. Furthermore, a press (not shown) having embossing and cutting tools may be integrated into device 1 for manufacturing wire coils 7 in the roll direction.

Wire guiding device 28, which is designed as a flyer, for example, for wire thicknesses of <1 mm wire diameter, is situated on a portal or a console rigidly or movably on a structure 20 of device 1 for manufacturing wire coils 7. This wire reaches a wire feed 26 of wire guiding device 28 from a wire drum (not shown). Wire guiding device 28 may be driven in two directions of rotation by a second drive 24 as a function of winding requirements of winding wire 5. In addition, wire guiding device 28 in the exemplary embodiment shown here is moved by a third drive 24 in a translatory movement on a carriage 22 to move wire guiding device 28 to different approach points as a function of the winding requirements of winding wire 5. The approach points here correspond to the positions of drums 34, 36, 38 on shaft 32.

As is also apparent from FIG. 3 in particular, bending pegs 34.1, 36.1, 38.1 each have a profile, which is mapped via the wire bending. The profile may be designed to be round or polygonal, for example, to create different bending radii and/or curved shapes for individual windings 7.1, 7.2, as is apparent from FIG. 4, for example. Furthermore, wire guiding device 28 may increase the wire tension during the bending operation to apply wire 5 to the corresponding profile of bending pegs 34.1, 36.1, 38.1.

As is also apparent from FIG. 3, first and second drums 34, 36 in the exemplary embodiment shown here have a polygonal profile, so that the lateral surfaces of drums 34, 36 each have a plurality of straight partial lateral surfaces 34.1, 36.1. This is also true of third drum 38 (not shown in FIG. 3), which has only one bending peg 38.1 situated on a straight partial lateral surface 38.2 in the exemplary embodiment shown here to finish end winding 7.2, as is apparent from FIGS. 1 and 2. The remaining lateral surface has a partially round cross section.

Figure 4:
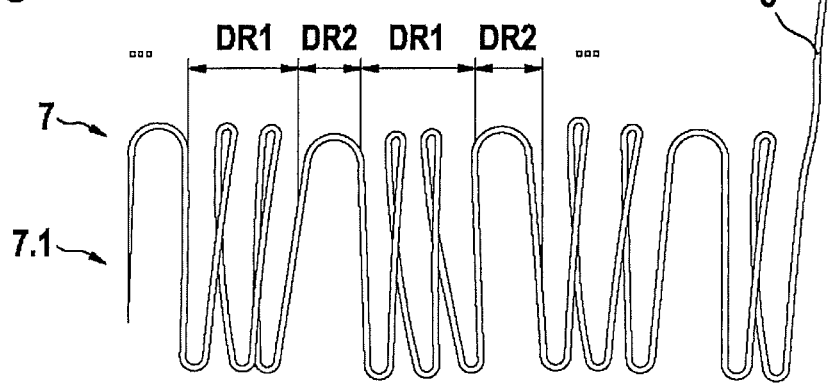
FIG. 4 shows a wire coil manufactured using the device for manufacturing wire coils according to FIGS. 1 through 3.

As is apparent from FIG. 4, a wire coil 7, which is shown here and may be used as a single phase of a continuous winding for generators, has multiple main windings 7.1 and an end winding 7.2. The main windings here have different bending radii, which are created via bending pegs 34.1, 36.1, 38.1 having different profiles and via different directions of rotation DR1, DR2 and feed rates of winding drum 30.

Device 1 shown here for manufacturing wire coils 7 is suitable in particular for manufacturing wire coils 7 for electric drives and generators. During the manufacture of a continuous winding for generators, individual phases 7 are laid in a flat package and compressed before bending and welding.

To manufacture wire coil 7 or the single phase, wire guiding device 28 winds wire 5 around bending pegs 34.1, 36.1, 38.1 on individual drums 34, 36, 38 of winding drum 30 due to a rotational movement, wire guiding device 28 being able to move back and forth between the approach points and individual drums 34, 36, 38 by displacement on carriage 22. Winding drum 30 clocks the division from winding to winding and at the same time conveys continuous phase 7 in the direction of the embossing and cutting tool (not shown).

During the winding operation, rotational movements to the left and right are provided for winding drum 30 and for wire guiding device 28, which is designed as a flyer, as a function of the winding requirement of winding wire 5. Furthermore, wire guiding device 28 has three approach points having the corresponding approach route. The winding of the wire on winding drum 30 takes place under elastic wire tension between at least two bending pegs 34.1, 36.1, 38.1 of winding drum 30. The bending of the wire takes place in the area of bending pegs 34.1, 36.1, 38.1, where the wire tension may be increased for applying wire 5 to the profile of corresponding bending peg 34.1, 36.1, 38.1. However, the elastic tension is predefined in such a way that the diameter of wire 5 changes by maximally ±2% during the winding and bending operation. Specific embodiments of the method according to the present invention for manufacturing wire coils, in particular for electric drives and generators, use a movable wire guiding device 28 to wind a wire 5 around bending pegs 34.1, 36.1, 38.1, which protrude essentially perpendicularly from at least two rotationally supported drums 34, 36, 38, to produce at least one wire winding 7.1, 7.2. The at least two rotationally supported drums 34, 36, 38 are at a predefined distance from one another. According to the present invention, wire 5 is aligned between two bending pegs 34.1, 36.1, 38.1 under a predefined elastic tension and is wound under tension around corresponding bending peg 34.1, 36.1, 38.1 due to a rotational movement. A first drum 34 having a predefined first number of bending pegs 34.1 is mounted on a rotary shaft 32 in an edge area. A second drum 36 having a predefined number of bending pegs 36.1 at a predefined first distance from first drum 34 is mounted on rotary shaft 32. In addition, a third drum 38 having a predefined third number of bending pegs 38.1 at a predefined second distance from first or second drum 34, 36 is mounted on shaft 32. The first number of bending pegs 34.1 and/or the second number of bending pegs 36.1 and/or the first distance and/or the second distance is/are advantageously predefined as a function of the winding requirements of winding wire 5 to be able to produce different specific embodiments of wire coils.

What is claimed is:

1. A device for manufacturing a wire coil, comprising:
   at least two rotationally supported drums which are mounted at a predefined distance from one another, the at least two drums each having at least one bending peg mounted on a lateral surface of the respective drum and protruding essentially perpendicularly to the lateral surface; and
   a movable wire guiding device configured to wind a wire around each of the at least one bending pegs which protrude from each of the at least two drums to produce at least one wire winding, wherein the wire guiding device is configured to align the wire between each of the at least one bending pegs under a predefined elastic tension and wind the wire under tension around each of the at least one bending pegs due to a rotational movement, wherein:
   a first drum having a predefined first number of bending pegs is mounted on a rotary shaft in an edge area;
   a second drum located at a predefined first distance from the first drum and having a predefined second number of bending pegs is mounted on the rotary shaft; and
   a third drum located at a predefined second distance from one of the first or second drum and having a predefined third number of bending pegs is mounted on the shaft.

2. The device as recited in claim 1, wherein at least one of (i) the first number of bending pegs, (ii) the second number of bending pegs, (iii) the first distance, and (iv) the second distance is predefined as a function of winding requirements of a winding wire.

3. The device as recited in claim 1, wherein the rotary shaft is drivable in two directions of rotation by a first drive as a function of winding requirements of a winding wire.

4. The device as recited in claim 3, wherein the wire guiding device is drivable in two directions of rotation by a second drive as a function of winding requirements of the winding wire.

5. The device as recited in claim 4, wherein the wire guiding device is movable in a translatory movement by a third drive on a carriage to move the wire guiding device to multiple approach points as a function of the winding requirements of the winding wire.

6. The device as recited in claim 5, wherein the approach points correspond to positions of the drums on the shaft.

7. The device as recited in claim 5, wherein the bending pegs each have a profile which is mapped via the wire bending.

8. The device as recited in claim 5, wherein the drums each have at least one of a round profile and a polygonal profile.

9. The device as recited in claim 5, wherein the elastic tension is predefined to provide a change in the diameter of the wire by maximally ±2% during the winding operation.

10. A method for manufacturing a wire coil, comprising:
    winding, by a movable wire guiding device, a wire around at least two bending pegs which protrude essentially perpendicularly from at least two rotationally supported drums to produce at least one wire winding;
    wherein the at least two drums are at a predefined distance from one another; and
    wherein the wire is aligned between the at least two bending pegs under a predefined elastic tension and wound under tension around the at least two bending pegs due to a rotational movement; and
    wherein a first drum having a predefined first number of bending pegs is mounted on a rotary shaft in an edge area; and
    wherein a second drum located at a predefined first distance from the first drum and having a predefined second number of bending pegs is mounted on the rotary shaft; and
    wherein a third drum located at a predefined second distance from one of the first or second drum and having a predefined third number of bending pegs is mounted on the shaft.

11. The method as recited in claim 10, wherein at least one of (i) the first number of bending pegs, (ii) the second number of bending pegs, (iii) the first distance, and (iv) the second distance is predefined as a function of winding requirements of a winding wire.

* * * * *